Dec. 14, 1965   E. E. DEISTER, JR   3,223,400
VIBRATION ISOLATION MOUNT
Filed Oct. 21, 1963
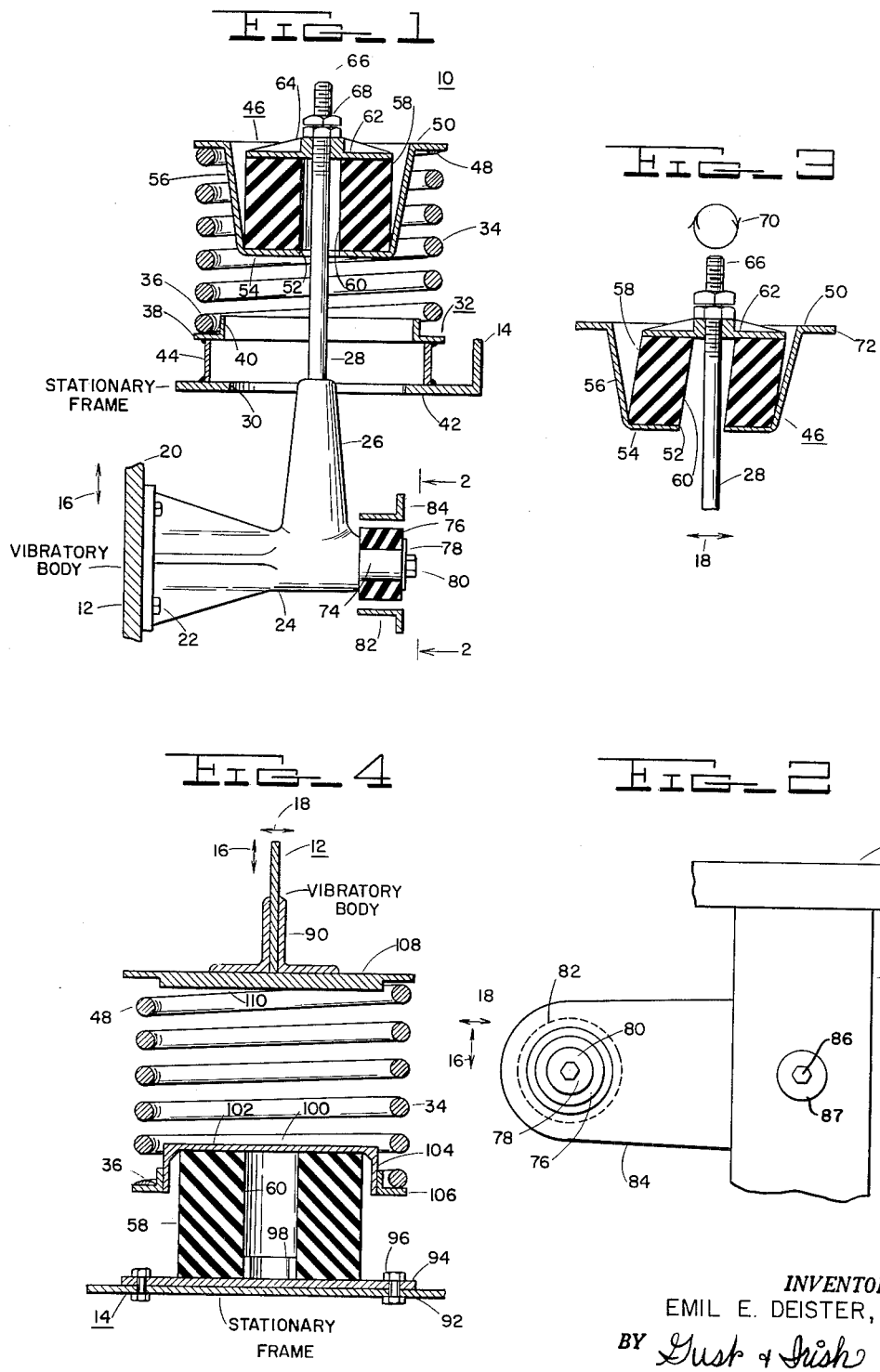
INVENTOR.
EMIL E. DEISTER, JR.
BY Gust & Irish
ATTORNEYS

United States Patent Office 3,223,400
Patented Dec. 14, 1965

3,223,400
VIBRATION ISOLATION MOUNT
Emil E. Deister, Jr., Fort Wayne, Ind., assignor to Deister Machine Company, Fort Wayne, Ind., a corporation of Indiana
Filed Oct. 21, 1963, Ser. No. 320,252
5 Claims. (Cl. 267—1)

This is a continuation-in-part of Emil E. Deister, Jr., application Serial No. 106,754, filed May 1, 1961, now abandoned.

This invention relates generally to vibration isolating mounting devices for vibratory apparatus.

It has been the conventional practice to provide spring mounts for vibratory apparatus, such as vibrating screens of the type employed for sizing of gravel, sand and the like, in order to isolate the vibration of the apparatus from its supporting structure. Certain vibratory apparatus employs an elliptical throw of the screen elements for controlling movement of the material on the screen, and the vibratory motion of the apparatus thus has a vertical component and a transverse component.

Prior spring mounts for such vibratory apparatus known to the present applicant have employed conventional coil springs interconnecting the apparatus and the supporting frame. Coil springs may be designed and constructed to absorb considerable vibration in a direction parallel with the spring axis; however, when the two ends of the spring are respectively engaged with the vibratory apparatus and the frame, vibration transversely of the spring axis is transmitted from the vibratory apparatus to the supporting frame. The transverse vibration also causes fatigue of the spring and frequent spring failure.

I have found that by providing a flexible column formed of highly resilient material, such as rubber, in series with a coil spring, the vibration component coaxial with the spring is absorbed by the spring-column series system; however, the vibration component transverse of the spring axis is principally absorbed by the column. With this arrangement, I have found that the transverse as well as the coaxial vibration components are substantially absorbed. Also, frequent spring failures encountered in prior coil spring mounts for vibratory apparatus are substantially eliminated.

It is accordingly an object of my invention to provide an improved vibration isolation mount.

Another object of my invention is to provide an improved vibration isolation mount for accommodating vibratory movement in two mutually perpendicular directions.

A further object of my invention is to provide an improved vibration isolation mount employing a coil spring and in which failure of the spring is substantially eliminated.

Further objects and advantages of my invention will become apparent by reference to the following description and the accompanying drawings and the features of novelty which characterize my invention will be pointed out with particularity in the claims annexed to and forming a part of this specification.

In the drawings:

FIG. 1 is a side view, partly in section and partly broken away, illustrating one embodiment of my invention;

FIG. 2 is a fragmentary side view of a part of the embodiment of FIG. 1;

FIG. 3 is a fragmentary cross-sectional view illustrating the mode of operation of the embodiment of FIG. 1; and FIG. 4 is a cross-sectional view illustrating another embodiment of my invention.

Referring now to FIGS. 1, 2 and 3, my improved vibration isolation mount, generally indicated at 10, is shown supporting vibratory body 12, such as the frame of a vibrating screen, from a stationary supporting frame 14. Body 12 is subject to vibratory motion having a vertical component, as shown by arrow 16, and a horizontal component, as shown by arrow 18.

Attached to the vertical face 20 of body 12 in any suitable manner, as by studs 22, is a support arm 24 which extends outwardly from body 12 generally at right angles to direction 16. Support arm 24 has a projection 26 formed on one side thereof outwardly from body 12 and extending upwardly parallel with direction 16. An elongated rod member 28 is attached to projection 26 and likewise extends upwardly parallel with direction 16; projection 26 and rod 28 extend upwardly through an opening 30 formed in stationary frame 14.

An annular spring seat member 32 is provided and a coil spring 34 has its lower end 36 seated on flange portion 38 of spring seat 32 with tubular portion 40 of the spring seat extending upwardly within spring 34, as shown. Flange 38 of spring seat 32 is in turn attached to portion 42 of stationary frame 14 by means of vertical members 44. It will be seen that the axis of spring 34 is parallel with vibratory motion component 16 and normally coaxial with rod 28 which extends upwardly within spring 34.

A cup-shaped member 46 is provided disposed within spring 34 at its upper end 48 and having its open end facing upwardly, as shown. Cup-shaped member 46 has an annular rim portion 50 which engages upper end 48 of spring 34. It will be seen that the cup-shaped member 46 is coaxial with spring 34. A central opening 52 is formed in the bottom wall 54 of the cup-shaped member 46 through which rod 28 extends, opening 52 normally defining a clearance with rod 28, as shown. Cup-shaped member 46 has a frusto-conical configuration with its side wall 56 tapering outwardly from its bottom wall 54 to its rim 50.

An elongated, cylindrical, tubular column 58 formed of suitable highly resilient material, such as rubber, is provided disposed within the cup-shaped member 46 and with its bottom end seated on the inner surface of bottom wall 54. The bore 60 of column 58 has the same diameter as central opening 52, is normally coaxial with cup-shaped member 46 and spring 34, and normally defines a clearance with rod 28 which extends upwardly therethrough, as shown. It will be seen that the diameter of column 58 is substantially the same as that of the inner surface of bottom wall 54 of cup-shaped member 46 and that the inner surface of side wall 56 thus normally defines a clearance with the outer peripheral surface of the column 58.

An annular plate member 62 is provided engaging the upper end of column 58 and preferably having substantially the same diameter as column 58. Rod 28 extends upwardly through hub portion 64 of plate member 62 and its upper end 66 is threaded to receive nuts 68 which in turn retain plate member 62 in engagement with column 58.

It will now be readily seen that insofar as the vibration component 16 is concerned, column 58 is coupled in series with coil spring 34 and thus the vibration component in the direction 16 is absorbed by the spring-column series system, particularly by spring 34. However, referring specifically to FIG. 3, it will be seen that the vibration component of body 12 in the direction 18 results in transverse deflection of column 58. Since plate member 62 which engages the upper end of column 58 is attached to rod 28, projection 26, support arm 24 and in turn to body 12, whereas the bottom end of the column 58 engages bottom wall 54 of cup-shaped member 46, which in turn is connected by spring 34 to stationary frame 14, the upper end of the column 58 is moved transversely with respect to its bottom end, thus transversely distorting column 58 and absorbing vibration component 18 by reason of shear forces in the column 58 acting in opposition to the distortion thereof. It will be seen that the transverse movement of rod 28 is accommodated within the clearance openings 52 in bottom wall 54 and 60 in column 58. It will further be seen that as soon as transverse deflection of column 58 is initiated, its outer peripheral surface will begin to engage the inner surface of side wall 56 of the cup-shaped member 46 and compress column 58, thus dampening or snubbing the transverse vibration component 18. As transverse deflection of column 58 increases, the engagement of its outer peripheral surface with the inner surface of side wall 56 and the compression of column 58 progressively increases, thus augmenting the snubbing action and the resistance of the afore-mentioned shear forces to the distortion of column 58.

It will be observed that in the embodiment of FIG. 1, the upper end 48 of spring 34 is not restrained in a plane parallel with that of bottom end 32, but, on the contrary, is engaged with rim 50 of cup-shaped member 46. It will be comprehended that while the vibratory motion of body 12 may be resolved into vertical and transverse components 16 and 18, the actual movement of end 66 of rod 28 may follow a circular path, as shown by arrow 70. Thus, while the vertical component of vibration 16 is absorbed by the spring-column series system and the transverse component is absorbed by the column 58 as above described, movement of end 66 of rod 28 in the direction shown by the arrow 70 will tend to tilt side 72 of rim 50 downwardly. However, since end 48 of spring 34 is not permanently restrained, the corresponding side of spring 34 is merely compressed without distorting the entire spring, as was previously the case. Thus, in accordance with my invention, by providing a resilient column in series with a coil spring and freeing one end of the spring from restraint in a plane parallel to its other end, all vibration components are absorbed without transverse distortion of the spring and the resulting failures due to fatigue.

Referring now specifically to FIGS. 1 and 2, there are certain critical speeds at which the mass-spring system will provide vibration of excessive amplitude. In order to dampen such excessive amplitude vibration, I provide a projection 74 on the end of support arm 24 remote from body 12 and coaxial with arm 24. Projection 74 is cylindrical and a bushing 76 formed of resilient material is seated on projection 74 and retained thereon by means of a suitable washer 78 and stud 80. Surrounding bushing 76 and normally having a clearance therewith is a sleeve member 82 attached to one end of lever member 84. The other end of lever member 84 is pivoted by a conventional friction connection 86 to frame element 88 which in turn is secured to stationary frame 14. This friction connection 86 is composed of a bolt and nut assembly having a spring washer 87 in engagement with element 88. Alternatively, the connection 86 may consist of an ordinary nut, bolt, washer assembly tightened sufficiently to engage frictionally said arm 84 with frame element 88. Thus, normal amplitude vibration of body 12 is accommodated by the clearance between sleeve 82 and bushing 76. However, excessive amplitude vibration results in engagement of bushing 76 with sleeve 82 and in turn pivotal movement of lever 84 through its frictional connection 86 with frame element 88, thus dampening the excessive amplitude vibration.

Referring now to FIG. 4, in which like elements are indicated by like reference numerals, I show a structure in which element 90 of vibratory body 12 is disposed in vertical alignment with element 92 of stationary frame 14. Here, I provide a base plate 94 secured to frame element 92 in any suitable manner, as by bolts 96. Resilient column 58 has its lower end seated on plate 94, which has a projection 98 extending into bore 60 of column 58, thus retaining the lower end of column 58 in a fixed location with respect to plate 94.

An inverted cup-shaped member 100 is provided having its open end facing downwardly, i.e., toward base 94 and with the inner surface of its bottom wall 102 engaging the upper end of column 58. In this embodiment, the side wall 104 of the cup-shaped member 100 has a cylindrical configuration with its inner surface defining an annular clearance with the outer peripheral surface of column 58. Flange members 106 are secured to side wall 104 of cup-shaped member 100 adjacent its open end and the bottom end 36 of coil spring 34 is seated thereon as shown. An upper spring seat member 108 is provided engaging the upper end 48 of coil spring 34 and element 90 of vibratory member 12, as shown. Upper spring seat member 108 has a portion 110 extending into spring 34 and it will be seen that the cup-shaped member 100 likewise extends into spring 34.

It will now be seen that again spring 34 and column 58 form a series system which cooperates to absorb the vertical vibration component 16. It will also be seen that the upper end of column 58 will deflect transversely to absorb a transverse vibration component 18. In this embodiment, the bottom end 36 of coil spring 34 is not restrained to a plane parallel with upper end 48, and thus, the actual motion of vibratory body 12 resulting from components 16 and 18 may result in tilting of cup-shaped member 100, and thus greater compression of one side of the spring than of the other without, however, transversely distorting the spring. It will be readily apparent that in the embodiment of FIG. 4, the relative positions of the vibratory body 12 and the stationary frame 14 may be reversed.

Typical dimensions of a working embodiment of this invention as shown in FIGS. 1 and 3 and as explained in the preceding are given in the following; however, this information is not intended as a limitation of this invention but only an exemplification thereof. The scope of this invention is defined by the claims appended hereto.

| | |
|---|---:|
| Coil spring 34 outside diameter ____inches__ | 7⅞ |
| Spring 34 wire diameter _____do____ | ⅞ |
| Material of spring 34 _____ | Spring steel |
| Number of active coils in spring 34__inches__ | 5.9 |
| Unloaded spring 34 height _____do____ | 8.7 |
| Depth of cup 46 _____do____ | 3.5 |
| Bottom inside diameter of cup 46 __do____ | 4⅝ |
| Top inside diameter of cup 46_____do____ | 5⅝ |
| Outside diameter of rubber column 58__do____ | 4½ |
| Inside diameter of rubber column 58 __do____ | 2 |
| Diameter of rod 28 _____do____ | 1¼ |
| Durometer of column 58 _____ | 55 to 60 |
| Height of column 58 _____inches__ | 3 |

In vibrating screen applications, it has been found that the helical spring constitutes the most satisfactory resilient mount from the standpoints of economy, strength and simplicity, and in distinct contrast, it has been found that mounts primarily of rubber are not satisfactory. Workloads carried by vibrating screens are customarily heavy, such that the resilient mounts must be strong as well as efficacious in isolating vibration. The helical spring as such provides these essentials with the exception of isolating transverse variation as previously explained; however, by combining the rubber column 58 with spring 34, the deficiencies of both wire springs and rubber cushions are overcome in obtaining an assembly having the necessary vibration-isolation characteristics and long wear-life. The lateral stiffness of the spring 34 is overcome by the lateral flexibility of the rubber column 58 such that for lateral vibration, the column 58 will laterally distort relative to the spring 34; i.e., all vibration components will be absorbed without transverse distortion of the spring 34 as previously explained.

While I have illustrated and described specific embodiments of my invention, further modifications and improvements will occur to those skilled in the art, and I desire, therefore, in the appended claims to cover all modifications which do not depart from the spirit and scope of my invention.

What is claimed is:

1. A vibration isolation mount for supporting a vibratory body on a stationary frame, said body having components of vibratory movement in a first direction and in a second direction transverse to said first direction, said mount comprising: a first member adapted to be attached to said body and to vibrate therewith; an elongated rod member having one end connected to said first member and extending in a direction parallel with said first direction; a second member adapted to be attached to said frame and having an annular spring seat portion; a coil spring having one end seated on said spring seat portion; said rod member extending through said spring seat portion and spring and normally coaxial therewith; a cup-shaped member coaxially disposed within said spring and having an annular rim portion engaging the other end of said spring, the bottom wall of said cup-shaped member having a central opening normally defining a clearance with said rod member, said clearance extending in said second direction; a cylindrical tubular column formed of resilient rubber-like material within said cup-shaped member and having one end seated on the inner surface of said bottom wall; said column having greater flexibility than said spring in said second direction, said rod member extending through said column and normally being coaxial therewith, the inner surface of the side wall of said cup-shaped member normally defining a clearance in said second direction with the outer peripheral surface of said column; and a member attached to the other end of said rod member and engaging the other end of said column, whereby said spring and column absorb the vibration component in said first direction and said column absorbs the vibration component in said second direction.

2. A vibration isolation mount for supporting a vibratory body on a stationary frame, said body having components of vibratory movement in a first direction and in a second direction transverse to said first direction, said mount comprising: a first member adapted to be attached to said body and to vibrate therewith; an elongated rod member having one end connected to said first member and extending in a direction parallel with said first direction; a second member adapted to be attached to said frame and having an annular spring seat portion; a coil spring having one end seated on said spring seat portion; said rod member extending through said spring seat portion and spring and normally coaxial therewith; a cup-shaped member coaxially disposed within said spring and having an annular rim portion engaging the other end of said spring, the bottom wall of said cup-shaped member having a central opening normally defining a clearance with said rod member, said clearance extending in said second direction; a cylindrical tubular column formed of resilient rubber-like material within said cup-shaped member and having one end seated on the inner surface of said bottom wall; said rod member extending through said column and normally being coaxial therewith, the inner surface of the side wall of said cup-shaped member normally defining a clearance in said second direction with the outer peripheral surface of said column, said column having greater flexibility than said coil spring in said second direction whereby said column may deform laterally with respect to said side wall; and a member attached to the other end of said rod member and engaging the other end of said column whereby said spring and column absorb the vibration component in said first direction and said column absorbs the vibration component in said second direction.

3. A vibration isolation mount for supporting a vibratory body on a stationary frame, said body having components of vibratory movement in a first direction and in a second direction transverse to said first direction, said mount comprising: a support arm having means for attaching the same to said body thereby to vibrate therewith; an elongated rod member having one end connected to said support arm and extending in a direction generally at right angles thereto and parallel with said first direction; an annular spring seat member having means for attaching the same to said frame; a coil spring having one end seated on said spring seat member; said rod member extending through said spring seat member and spring and normally coaxial therewith; a cup-shaced member coaxially disposed within said spring at the other end thereof with its open end facing said other end of said spring, said cup-shaped member having an annular rim portion engaging said other end of said spring, the bottom wall of said cup-shaped member having a central opening formed therein; said rod member extending through said central opening and normally being coaxial therewith, said central opening normally defining a clearance with said rod member, said clearance extending in said second direction; a cylindrical tubular column formed of resilient rubber-like material disposed within said cup-shaped member and having one end seated on the inner surface of said bottom wall, the diameter of said column being generally the same as that of said bottom wall, said column having a bore coaxial with said central opening and of substantially the same diameter; said column having greater flexibility than said coil spring in said second direction, said rod member extending through said bore and normally being coaxial therewith, the surface of said bore normally defining a clearance with said rod member; the side wall of said cup-shaped member tapering outwardly away from said bottom wall whereby its inner surface defines a clearance with the outer peripheral surface of said column; and an annular member attached to the other end of said rod member and engaging substantially the entire surface area of the other end of said column whereby said spring and column absorb the vibration component in said first direction and said column absorbs the vibration component in said second direction.

4. A vibration isolation mount for supporting a vibratory body on a stationary frame, said body having components of vibratory movement in a vertical direction and in a horizontal direction, said mount comprising: a horizontally extending support arm having means for attaching the same to said body thereby to vibrate therewith; an elongated rod member having one end connected to said support arm and extending vertically therefrom; an annular spring seat member having means for attaching the same to said frame; a coil spring having one end seated on said spring seat member; said rod member extending through said spring seat member and spring and normally coaxial therewith; a cup-shaped member coaxially disposed within said spring at the other end thereof with its open end facing said other end of said spring, said cup-shaped member having an annular rim portion engaging said other end of said spring, the bottom wall of said cup-shaped member having a central opening formed therein; said rod member extending through said central opening and normally being coaxial therewith, said central opening normally defining a clearance with said rod member, said clearance extending in said second direction; a cylindrical tubular column formed of resilient rubber-like material disposed within said cup-shaped member and having one end seated on the inner surface of said bottom wall, the diameter of said column being generally the same as that of said bottom wall, said column having a bore coaxial with said central opening and of substantially the same diameter; said rod member extending through said bore and normally being coaxial therewith, the surface of said bore normally defining a clearance with said rod member; said column being more flexible horizontally than said coil spring whereby said column may be distorted relative to said coil spring; the side wall of said cup-shaped member tapering outwardly away from said bottom wall whereby its inner surface defines a clearance with the outer peripheral surface of said column, said column being deformable radially with respect to said cup-shaped member; and an annular member attached to the other end of said rod member and engaging substantially the entire surface area of the other end of said column whereby said spring and column absorb the vibration component in said vertical direction and said column absorbs the vibration component in said horizontal direction.

5. A vibration isolation mount for supporting a vibratory body on a stationary frame, said body having components of vibratory movement in a first direction and in a second direction transverse to said first direction, said mount comprising: a first member adapted to be attached to said body and to vibrate therewith, a second member adapted to be attached to said frame; a helical coil spring having one end seated on said second member and having its axis parallel with said first direction for absorbing the vibration component in said first direction, a cup-shaped member having a frusto-conically shaped side wall and bottom, said cup-shaped member being positioned within said spring and having means extending radially outwardly therefrom adjacent the open end and engaging the other end of said spring, said bottom having an opening therethrough; and a cylindrical tubular column formed of rubber material within said cup-shaped member and having one end seated on the bottom of said cup-shaped member, the opening in said bottom registering with the opening of said column, said first member extending through said spring and the openings in said bottom and column and having a clearance in said second direction with said bottom and column, the other end of said column operatively engaging and supporting said first member, said column having its axis normally in alignment with the axis of said spring and absorbing the vibration component in said second direction, the inner surface of the side wall of said cup-shaped member normally defining a clearance with the outer peripheral surface of said column thereby providing for relative lateral movement of said column with respect to said cup-shaped member.

References Cited by the Examiner
UNITED STATES PATENTS

| | | |
|---|---|---|
| 2,510,353 | 6/1950 | Travilla. |
| 2,538,380 | 1/1951 | Pflager _____ 105—190 |
| 2,573,108 | 10/1951 | Piron _____ 267—3 |
| 2,660,423 | 11/1953 | Roy _____ 267—1 |
| 2,693,331 | 11/1954 | Soldan _____ 248—18 |
| 3,052,435 | 9/1962 | Roller _____ 248—21 X |

FOREIGN PATENTS

| | | |
|---|---|---|
| 265,824 | 1/1957 | Great Britain. |

ARTHUR L. LA POINT, *Primary Examiner.*